(12) United States Patent
Yu et al.

(10) Patent No.: US 6,956,690 B2
(45) Date of Patent: Oct. 18, 2005

(54) ELECTROPHORETIC DISPLAY WITH A BI-MODAL PARTICLE SYSTEM

(75) Inventors: Wenxin Yu, San Ramon, CA (US); Jing-Den Chen, Milpitas, CA (US); HongMei Zang, Sunnyvale, CA (US); Rong-Chang Liang, Cupertino, CA (US)

(73) Assignee: SiPix Imaging, Inc., Milpitas, CA (US)

( * ) Notice: Subject to any disclaimer, the term of this patent is extended or adjusted under 35 U.S.C. 154(b) by 2 days.

(21) Appl. No.: 10/772,491

(22) Filed: Feb. 4, 2004

(65) Prior Publication Data
US 2004/0223208 A1 Nov. 11, 2004

Related U.S. Application Data

(60) Provisional application No. 60/445,590, filed on Feb. 6, 2003.

(51) Int. Cl.$^7$ ............... G02B 26/00; G09G 3/34; G03B 17/04
(52) U.S. Cl. ............ 359/296; 345/107; 359/290
(58) Field of Search ............... 359/290, 296, 359/252, 253; 345/105, 107; 430/32, 34, 38

(56) References Cited

U.S. PATENT DOCUMENTS

| 2001/0030639 A1 | 10/2001 | Goden |
| 2002/0097198 A1 | 7/2002 | Kanazawa et al. |

FOREIGN PATENT DOCUMENTS

| EP | 0 962 808 | 12/1999 |
| EP | 1 262 817 | 12/2002 |
| WO | PCT/US04/003531 | 7/2004 |

Primary Examiner—Timothy Thompson
(74) Attorney, Agent, or Firm—Howrey Simon Arnold & White, LLP

(57) ABSTRACT

This invention relates to an electrophoretic display having display cells filled with an electrophoretic composition which comprises a bi-modal particle system dispersed in a dielectric solvent or solvent mixture. The display has shown a higher % reflectance or whiteness, a higher contrast ratio, improved threshold characteristics and better bistability.

33 Claims, 2 Drawing Sheets

Primary Particles

Filler Particles

○ Primary Particles

○ Filler Particles

ELECTROPHORETIC DISPLAY WITH A BI-MODAL PARTICLE SYSTEM

The present invention claims the benefit of U.S. Provisional Application 60/445,590. filed Feb. 6, 2003; which is incorporated herein by reference in its entirety.

FIELD OF THE INVENTION

This invention relates to an electrophoretic display having display cells filled with an electrophoretic composition which comprises a bi-modal particle system dispersed in a dielectric solvent or solvent mixture. The display has shown a higher % reflectance or whiteness, a higher contrast ratio, improved threshold characteristics and better bistability.

DESCRIPTION OF RELATED ART

The electrophoretic display (EPD) is a non-emissive device based on the electrophoresis phenomenon influencing charged pigment particles suspended in a colored dielectric solvent. This type of display was first proposed in 1969 (U.S. Pat. Nos. 3,612,758, 3,668,106 and 3,892,568). An EPD typically comprises a pair of opposed, spaced-apart plate-like electrodes, with spacers predetermining a certain distance between the electrodes. At least one of the electrodes, typically on the viewing side, is transparent. For the passive type of EPDs, row and column electrodes on the top (the viewing side) and bottom plates respectively, are needed to drive the displays. In contrast, an array of thin film transistors (TFTs) on the bottom plate and a common, non-patterned transparent conductor layer on the top viewing substrate are required for the active type EPDs. An electrophoretic fluid composed of a colored dielectric solvent and charged pigment particles dispersed therein is enclosed between the two electrodes.

When a voltage difference is imposed between the two electrodes, the pigment particles migrate by attraction to the plate of polarity opposite that of the pigment particles. Thus, the color showing at the transparent plate, determined by selectively charging the plates, can be either the color of the solvent or the color of the pigment particles. Reversal of plate polarity will cause the particles to migrate back to the opposite plate, thereby reversing the color. Intermediate color density (or shades of gray) due to intermediate pigment density at the transparent plate may be obtained by controlling the plate charge through a range of voltages. In addition to the single-pigment electrophoretic system mentioned above, multi-pigment systems having more than one type of electrophoretic materials or pigment particles of different electrophoretic polarity or mobility have also been disclosed.

EPDs of different pixel or cell structures have been reported previously, for example, the partition-type EPD (M. A. Hopper and V. Novotny, *IEEE Trans. Electr. Dev.*, 26(8):1148–1152 (1979)) and the microencapsulated EPD (for examples, U.S. Pat. Nos. 5,961,804, 5,930,026, 6,177,921 and 6,323,989).

An improved EPD technology was recently disclosed in co-pending applications, U.S. Ser. No. 09/518,488, filed on Mar. 3, 2000 (corresponding to WO 01/67170 published on Sep. 13, 2001), U.S. Ser. No. 09/606,654, filed on Jun. 28, 2000 (corresponding to WO02/01281) and U.S. Ser. No. 09/784,972, filed on Feb. 15, 2001 (corresponding to WO02/65215), all of which are incorporated herein by reference. The improved EPD comprises isolated cells formed from microcups of well-defined shape, size and aspect ratio and filled with charged pigment particles dispersed in a dielectric solvent. The filled cells are individually top-sealed with a polymeric sealing layer, preferably formed from a composition comprising a thermoset, thermoplastic or precursor thereof.

The microcup structure and novel top-sealing processes and materials enable a format flexible and efficient roll-to-roll continuous manufacturing process for the EPDs. The displays can be prepared on a continuous web of a conductor film such as ITO/PET by, for example, (1) coating a radiation curable composition onto the ITO/PET film, (2) making the microcup structure by a microembossing or photolithographic method, (3) filling the microcups with an electrophoretic fluid and top-sealing the microcups, (4) disposing another substrate or electrode layer onto the top-sealed microcups and (5) slicing and cutting the display into a desirable size or format for assembling.

The microcup EPDs may have the traditional up/down switching mode, the in-plane switching mode as disclosed in the co-pending application Ser. No. 10/198,729 filed on Jul. 16, 2002 or the dual switching mode as disclosed in the co-pending application Ser. No. 10/222,036 filed on Aug. 16, 2002, the contents of these co-pending applications are incorporated herein by reference in their entirety. In the display having the traditional up/down switching mode or the dual switching mode, there are a top transparent electrode plate, a bottom electrode plate and a plurality of isolated cells enclosed between the two electrode plates. In the display having the in-plane switching mode, the cells are sandwiched between a top transparent insulator layer and a bottom electrode plate.

For all types of the EPDs, the dispersion contained within the individual cells of the display is undoubtedly one of the most crucial parts of the device. The dispersion, as stated earlier, usually is composed of white pigment particles dispersed in a contrast-colored dielectric solvent or solvent mixture. The contrast color of the device may be achieved by using a dye solution of a pigment of a contrast color. The composition of the dispersion determines, to a large extent, the lifetime, contrast ratio, switching rate, response waveform, threshold characteristics and bistability of the device. In an ideal dispersion, the pigment particles remain well dispersed and do not agglomerate under all operating conditions. Furthermore, all components in the dispersion must be chemically and electrochemically stable and compatible not only with each other but also with the other materials present in an EPD, such as the electrodes and sealing materials.

However, the dispersion systems currently available have shown unsatisfactory % reflectance or whiteness. In the "single-particle" electrophoretic systems containing charged white particles in a clear dye solution, the hiding power of the white particles is largely determined by the packing density and the colloidal stability of the particles attracted electrically to the electrode plate. For particles of narrow particle size distribution, the maximum packing densities for cubical and tetrahedral packing structures are about 52% and about 74% by volume, respectively. A review for the pigment packing in paints and coatings can be found in T. C. Patton, "Paint Flow and Pigment Dispersion", $2^{nd}$ ed., John Wiley & Sons, (1979). The particle packing density of an electrophoretic device is typically much lower than the maximum probably because the particles tend to form aggregated clusters or flocculated net-work structures [see A. L. Dalisa, IEEE Trans. Electron Devices, ED-24, P. 827 (1977) and P. Murau and B. Singer, J. Appl. Phys., 49(9), 4820 (1978)]. The dye solution trapped in the interstices or cavities between the particles, particularly flocculated particles, is one of the major reasons for the high Dmin or low % reflectance in most single-pigment electrophoretic systems.

In contrast, in the two-particle electrophoretic system comprising particles of opposite polarity in a colorless solvent, the above-mentioned problem of high Dmin may be less of an issue. The two opposite-charged pigment particles may be driven to opposite sides of the device and in theory, no color solution may be trapped in the interstices. However, the two opposite-charged pigment particles tend to aggregate to form undesirable network structures and result in a significant deterioration in Dmin or % reflectance. The network formation in the absence of an electric field also tends to result in an inferior image bistability, image uniformity and colloidal stability.

SUMMARY OF THE INVENTION

The first aspect of the present invention is directed to a bi-modal electrophoretic composition comprising two types of particles having substantially the same polarity and substantially the same electrophoretic mobility or switching rate. One of the two types of particles is the primary pigment particles and the other is the filler particles of a smaller size.

The packing density of the primary particles is significantly enhanced by the smaller filler particles in the interstices of the primary particles. The electrophoretic display or device comprising the bimodal electrophoretic composition of the present invention exhibits a higher contrast ratio, improved threshold characteristics and better image bistabililty. When white pigment or pigment-containing microparticles are used in the electrophoretic composition, a higher % reflectance or whiteness is also achieved.

The second aspect of the invention is directed to an electrophoretic display or device comprising display cells filled with a bi-modal electrophoretic composition which comprises the two types of particles dispersed in a dielectric solvent or solvent mixture.

DETAILED DESCRIPTION OF THE INVENTION

Definitions

Figure 1A:
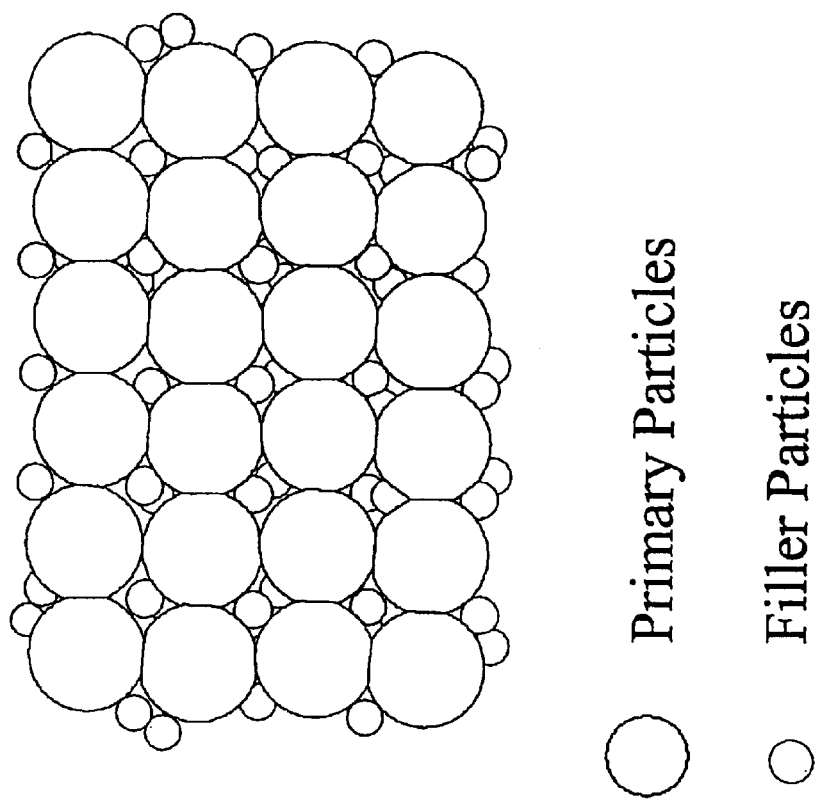
FIGS. 1A and 1B illustrate the two- and three-dimensional views of the bi-modal system of the present invention.
Figure 1B:
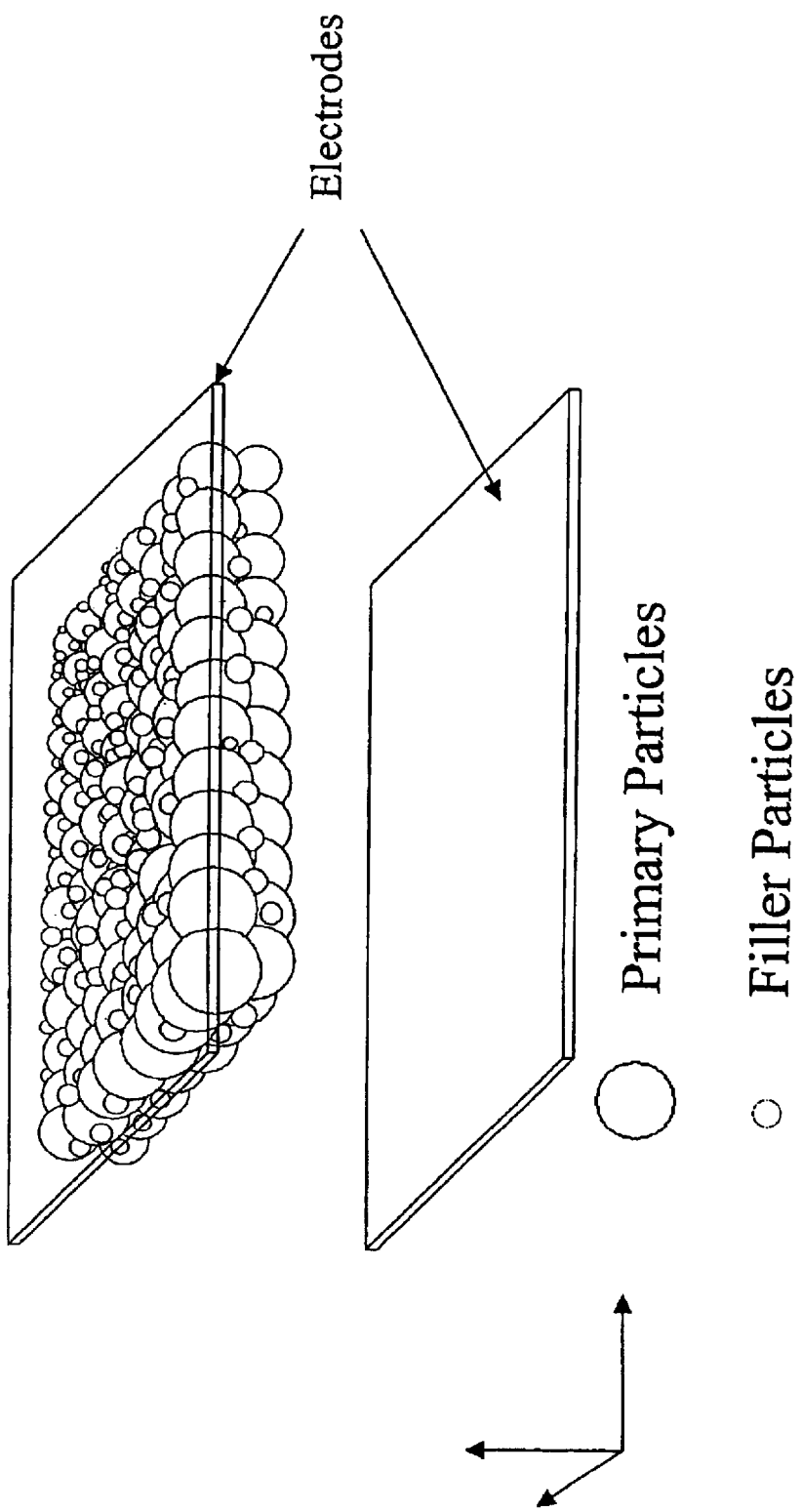

Unless defined otherwise in this specification, all technical terms are used herein according to their conventional definitions as they are commonly used and understood by those of ordinary skill in the art. Tradenames are identified for materials used and their sources are also given.

The term "bimodal particle system" or "bimodal electrophoretic composition" of the present invention refers to an electrophoretic dispersion comprising two types of particles of distinctly different particle sizes or particle size distributions. The two types of particles may be of the same color or the filler particles may be colorless.

The term "Dmax" refers to the maximum achievable optical density of the display.

The term "Dmin" refers to the minimum optical density of the display background.

The term "contrast ratio" is defined as the ratio of the % reflectance of an electrophoretic display at the Dmin state to the % reflectance of the display at the Dmax state.

The "display cells", in the context of the present invention, preferably are the display cells prepared from microcups according to any of the processes as described in WO01/67170 or the microcapsules or capsules prepared according to, for example, U.S. Pat. Nos. 5,961,804 and 5,930,026 and the copending U.S. patent application Ser. No. 60/443,893 filed on Jan. 30, 2003, the contents of which are incorporated herein by reference in their entirety. While the plural form (i.e., display cells) is used, the term is not intended to limit the scope of protection. It is understood that a display may have multiple display cells or one single display cell.

The term "top-sealing" is intended to refer to a sealing process in which the display fluid is filled and top-sealed in the display cells constructed on a first substrate or electrode layer. In conventional edge seal processes, two substrates or electrode layers and an edge seal adhesive are required to enclose and edge-seal the display fluid in the cell(s). In contrast, in the top-sealing processes, the display fluid is enclosed and top-sealed before a second substrate or electrode layer is disposed on to the display cells.

The term "primary particles" refers to the charged pigment particles that scatter and reflect light back to the viewer. The primary particles, in the context of the present invention, may be the charged primary pigment particles or pigment-containing microcapsules or microparticles.

The term "filler particles" in the context of the present invention, refers to the small particles used to improve the packing density of the primary pigment particles at or near the electrode by filling in the interstices or holes between the primary pigment particles.

I. The Primary Particles

The charged primary pigment particles may be formed of an organic or inorganic pigment. To achieve a high light scattering, primary pigments of high refractive index are particularly useful. Suitable white pigment particles include $TiO_2$, $BaSO_4$, ZnO or hollow particles, with $TiO_2$ being the most preferred. Suitable color pigment particles may include those formed from phthalocyanine blue, phthalocyanine green, diarylide yellow, diarylide AAOT yellow, quinacridone, azo, rhodamine, perylene pigment series from Sun Chemical, Hansa yellow G particles from Kanto Chemical, Carbon Lampblack from Fisher and the like. The particle size or diameter of the primary pigment or pigment-containing microparticles may be in the range of about 0.1 to about 10 microns, preferably in the range of about 0.2 to about 2 microns. The particles should have acceptable optical characteristics, should not be swollen or softened by the dielectric solvent and should be chemically stable. The resulting dispersion must also be stable against sedimentation, creaming or flocculation under normal operating conditions.

While the white $TiO_2$ particles may be specifically discussed or exemplified in the application, it is understood that the bi-modal particle system of the present invention is applicable to primary pigment particles of any color. In order to match the density of the particles to that of the dielectric solvent in which the particles are dispersed, both the primary and filler particles may be microencapsulated or coated with a polymer matrix of low specific gravity to form pigment-containing microcapsules or microparticles. The preparation of the pigment-containing microparticles is disclosed in the co-pending applications, U.S. Ser. No. 60/345,936 filed on Jan. 3, 2002, U.S. Ser. No. 60/345,934 filed on Jan. 3, 2002, U.S. Ser. No. 10/335,210 filed on Dec. 31, 2002, U.S. Ser. No. 10/335,051 filed on Dec. 31, 2002, U.S. Ser. No. 60/400,021 filed on Jul. 30, 2002, Ser. No. 60/418,078 filed on Oct. 10, 2002 and U.S. Ser. No. 10/632,171 filed on Jul. 30, 2003, the contents of all of which are incorporated herein in their entirety by reference.

Briefly, the pigment-containing microparticles may be prepared by a microencapsulation process involving the use of a protective colloid or dispersant to form part of the charged shell of pigment-containing microparticles. In the process, an internal phase dispersion comprising primary pigment particles, such as TiO$_2$, a shell-forming monomer or oligomer and optionally a fugitive solvent or diluent is emulsified into a continuous phase which comprises a protective colloid, preferably a reactive protective colloid and/or a complementary reactant, in a fluorinated solvent or solvent mixture. During the emulsification step, a hard shell is formed around the internal phase particles as a result of the interfacial polymerization/crosslinking between the shell-forming monomer or oligomer from the internal phase and the reactive protective colloid and/or complementary reactant in the continuous phase (external phase).

The shell-forming monomers or oligomers suitable for the present invention may include multifunctional amines, isocyanates, thioisocyanates, epoxides, acid chlorides, acid anhydrides, chloroformates, alkoxysilanes, amines, thiols, alcohols and their precondensates and vinyl monomers such as acrylates, methacrylates or styrene. The shell-forming monomer or oligomer may be added in the amount of about 5 to about 300 wt %, preferably about 50 to about 150 wt %, more preferably about 80 to about 120 wt % based on the pigment used in the internal phase.

To facilitate the emulsification process, a fugitive solvent or diluent may be used to reduce the viscosity of the pigment pre-dispersion and it is removed later by heat and/or vacuum during or after the emulsification step. To facilitate the stripping process, the boiling point of the fugitive diluent is preferably lower than about 160° C., more preferably lower than about 120° C. Examples of suitable fugitive solvents may include acetone, methyl ethyl ketone (MEK), methyl propyl ketone, cyclohexanone, ethyl acetate, propyl acetate, methylene chloride, tetrahydrofuran, toluene, xylene and the like.

A protective colloid or polymeric dispersant may be used to improve the emulsification process and stabilize the emulsion droplets formed. The protective colloid is typically dissolved in the continuous (external) phase. To achieve optimal emulsification and stabilization efficiency, the protective colloid preferably comprises a complementary reactive functional group capable of reacting with the shell-forming monomer or oligomer from the internal phase to form a crosslinked shell to which the protective colloid is chemically bonded.

The complementary reactive group of the protective colloid in the continuous (external) phase is determined by the shell-forming monomer or oligomer used in the dispersed phase or vice-versa. The pair may be any functional groups and their reactive counterparts. Examples of pairs of reactive groups may include, but are not limited to, amine/isocyanate, amine/thioisocyanate, amine/acid chloride or anhydride, amine/chloroformate, amine/epoxide, alcohol/isocyanate, alcohol/thioisocyanate, thiol/isocyanate, thiol/thioisocyanate, carbodiimide/epoxide, alcohol/siloxane and the like.

The functional groups of the two phases may be reversed. For example, in one embodiment, the reactive monomer or oligomer in the internal phase may have an isocyanate functional group and the protective colloid in the external phase may have an amine functional group. In another embodiment, the amine functional group may be in the internal phase whereas the isocyanate functional group is in the continuous phase.

Specific examples of suitable protective colloids include amino- or hydroxy-functionalized fluorinated, particularly perfluorinated polymers or oligomers derived from perfluoro hydrocarbons or perfluoropolyethers (from Du Pont and Solvay Solexis). The polyfluoroether amines represented by the following formula:

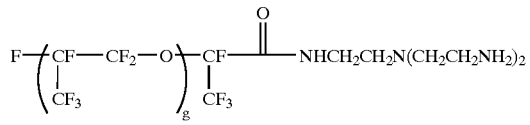

wherein g is 1–10,000, preferably 3–300, are particularly useful. Suitable polyfluoroether amines have a molecular weight ranging from about 300 to about 50,000, preferably from about 500 to about 15,000. They may be prepared under mild conditions by reacting a polyfluoroether substituted with at least one ester group with a multifunctional amine.

Suitable complementary reactants in the external phase include crosslinkers or chain extenders for the shell-forming monomer or oligomer in the internal phase.

Charge controlling agents are commonly used in an electrophoretic fluid to control the charge polarity and charge density. They may be adsorbed on, preferably chemically bonded to, the particle surface. Suitable charge controlling agents may include metal soaps or complexes and the acid-base or donor-acceptor type charge control agents.

Details of reactive protective colloids and charge control agents for the preparation of pigment-containing microcapsules are disclosed in the copending application, U.S. Ser. Nos. 60/345,934 and 60/345,936 both filed on Jan. 3, 2002, U.S. Ser. Nos. 10/335,210 and 10/335,051 both filed on Dec. 31, 2002, the contents of which are incorporated herein by reference in their entirety.

The internal phase may be post-cured by a radical or condensation polymerization/crosslinking mechanism during or after the shell-forming interfacial reaction step. The process allows the pigment to be density matched to that of the dielectric solvent.

Suitable solvents generally have low vapor pressure, low viscosity and a dielectric constant in the range of about 1.7 to about 30, preferably about 1.7 to about 5. Examples of suitable fluorinated solvents include, but are not limited to, perfluoro solvents such as perfluoroalkanes or perfluorocycloalkanes (e.g., perfluorodecalin), perfluoroarylalkanes (e.g., perfluorotoluene or perfluoroxylene), perfluoro-tert-amines, perfluoropolyethers such as those from Galden/Fomblin and perfluoropolyethers HT series, and hydrofluoropolyethers (ZT series) from Solvay Solexis, FC-43 (heptacosafluorotributylamine), FC-70 (perfluorotri-n-pentylamine), PF-5060 or PF-5060DL (pefluorohexane) from 3M Company (St. Paul, Minn.), low molecular weight (preferably less than 50,000, more preferably less than 20,000) polymers or oligomers such as poly (perfluoropropylene oxide) from TCI America (Portland, Oreg.), poly(chlorotrifluoroethylene) such as Halocarbon Oils from Halocarbon Product Corp. (River Edge, N.J.), Krytox® K-fluids (trifluorohomopolymer) from Dupont, and Demnum lubricating oils from Daikin Industries. Perfluoropolyethers and hydrofluoropolyethers such as Solvay Solexis HT-170, HT-200, HT-230, ZT-180 and Dupont trifluoro(trifluoromethyl)oxirane homopolymers (such as K-6 and K-7 fluids) are useful.

The emulsification of the internal dispersion phase into the continuous phase may be accomplished by either a direct or inverse emulsification process. Alternatively, the pigment-containing microparticles may be prepared by a microencapsulation process involving the use of a fluorinated quaternary salt or the fused ring or polynuclei derivatives or isomers thereof, as disclosed in the copending applications, U.S. Ser. No. 60/400,021 filed on Jul. 30, 2002, Ser. No. 60/418,078 filed on Oct. 10, 2002 and U.S. Ser. No. 10/632,171 filed on Jul. 30, 2003, the contents of both are incorporated herein in their entirety by reference. In this case, the internal phase dispersion of the process comprises primary pigment particles and a shell-forming monomer or oligomer as described above. The continuous phase may optionally comprise a reactive protective colloid in a fluorinated solvent. The quaternary salt or a derivative thereof may be added to the internal dispersion phase, the continuous phase or both, depending on the solubility of the quaternary salt.

II. Filler Particles

In general, the filler particles preferably have the following physical or chemical properties. Firstly, they are small enough to be filled in the interstices of the primary particles attracted to the electrode. In one embodiment, ratio of the average particle size or diameter of the filler particles to that of the primary pigment particles is in the range of about 1/30 to about 1/5, preferably about 1/15 to about 1/8. For example, to fill in the interstices or holes between the primary pigment particles having an average diameter of about 0.2 to about 5 microns, the average diameter of the filled particles may be in the range of about 0.007 to about 1 microns, preferably in the range of about 0.013 to about 0.63 microns. Secondly, the filler particles should carry the same charge polarity and exhibit the same or comparable electrophoretic mobility as the primary particles. Preferably, the difference in the electrophoretic velocity of the two types of particles is less than about 30%, preferably less than about 20% of the average velocity of the primary pigment particles. As a result, when a voltage difference is applied, the primary pigment particles and the filler particles migrate towards the same direction at substantially the same speed. Thirdly, to achieve a good light scattering efficiency, the filler particles may have a refractive index significantly different from that of the primary particles. The refractive index difference between the two types of particles may be greater than 0.2, preferably greater than 1. Fourthly, the filler particles must have a satisfactory dispersion and electrochemical stability, even under a high electric field. Preferably both the filler particles and the primary pigment particles are microencapsulated or polymer-coated to density-match to that of the dielectric solvent. When the primary particles are the $TiO_2$ particles, the filler particles should be colorless or white with a low refractive index to maximize the light scattering effect. Examples of filler materials for filling the interstices of $TiO_2$ particles may include, but are not limited to, polymer particles such as PMMA (polymethylmethacrylate) latex or dispersion, glass beads, ZnO, $BaSO_4$, silica or the like. Polymer particles and silica, particularly crosslinked polymer particles and polymer-coated silica particles are preferred. They may be prepared by grinding, milling, attrition, precipitation, dispersion or emulsion polymerization, microencapsulation or a combination thereof. The microencapsulation of the filler particles may be accomplished in the same manner as described above for the primary pigment particles.

III. The Bi-modal System

The volume ratio of the filler particles to the primary particles may be in the range of about 5/95 to about 40/60, preferably about 15/85 to about 30/70. The two types of particles may be dispersed separately in a dielectric solvent and subsequently blended in a mixer or a homogenizer. Suitable solvents include, but are not limited to, those disclosed above for the microencapsulation process. Additional dispersant or charge controlling agent may be used to improve the colloidal stability and the charge characteristics of the blend.

IV. Electrophoretic Displays with the Bi-model System

The electrophoretic displays with the bi-modal system of the present invention may be driven by the traditional up-down switching mode, the in-plane switching mode as disclosed in the co-pending application Ser. No. 10/198,729 filed on Jul. 16, 2002 or the dual switching mode as disclosed in the co-pending application Ser. No. 10/222,036 filed on Aug. 16, 2002, the contents of these co-pending applications are incorporated herein by reference in their entirety.

EXAMPLES

The following examples are given to enable those skilled in the art to more clearly understand, and to practice, the present invention. They should not be considered as limiting the scope of the invention, but merely as being illustrative and representative thereof.

Preparation 1

Synthesis of Perfluorinated Reactive Dispersant $R_f$ amine 4900

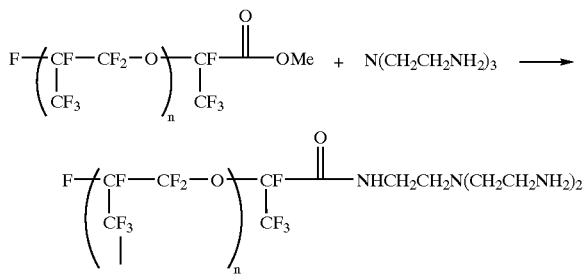

48 Gm of Krytox® methyl ester (DuPont, MW=about 4800, n=about 30) was dissolved in 100 gm of 1,1,2-trichlorotrifluoroethane (Aldrich). The resultant solution was added drop by drop into a solution containing 7.3 gm of tris(2-aminoethyl)amine (Aldrich) in 45 gm trifluorotoluene and 90 gm 1,1,2-trichlorotrifluoroethene over 2 hours with stirring at room temperature. The mixture was then stirred for another 8 hours to allow the reaction to complete. The IR spectrum of the crude product clearly indicated the disappearance of C=O vibration for methyl ester at 1780 $cm^{-1}$ and the appearance of C=O vibration for the amide product at 1695 $cm^{-1}$. Solvents were removed by rotary evaporation. The crude product was then dissolved in 250 ml of PFS2 solvent (perfluoropolyether from Solvay Solexis) and extracted with 100 ml of ethyl acetate three times, then dried over magnesium sulfate to yield 42 gm of purified product ($R_f$ amine 4900) which showed excellent solubility in HT200.

Other reactive $R_f$ amines having different molecular weights such as $R_f$-amine2000 (n=about 11) and $R_f$-amine800 (n=about 4) were also synthesized according to the same procedure.

Preparation 2

Synthesis of a Reactive Fluorinated Pyridinium Salt

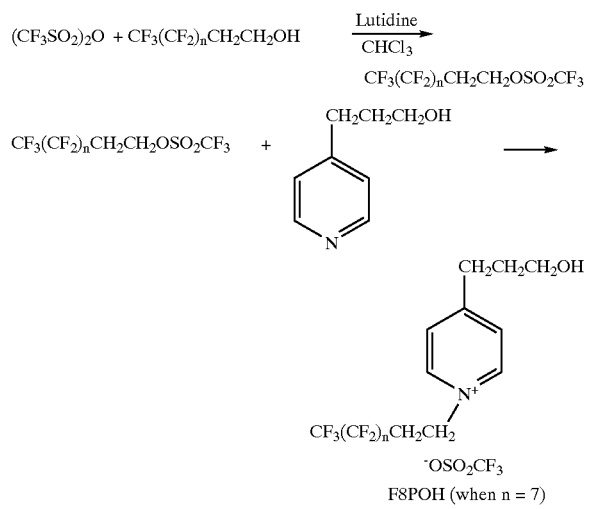

F8POH (when n = 7)

3.21 Gm (30.0 mmol) of 2,6-lutidine (Aldrich) and 11.6 gm (25.0 mmol) of 1H, 1H, 2H, 2H-perfluorodecanol [$CF_3(CF_2)_nCH_2CH_2OH$, n=7] were dissolved in 150 ml of chloroform in a flask and cooled in a 0° C. bath. To the solution, 8.5 gm (30.0 mmol) of trifluoromethanesulfonic anhydride pre-dissolved in 100 ml of chloroform was added drop-wise with stirring over a period of 30 minutes. The mixture was stirred for at least another 8 hours at room temperature to allow the reaction to complete. The reaction mixture was washed with deionized water three times, dried over magnesium sulfate and the solvent was stripped off. The crude product was recrystallized from heptane/methylene chloride and rinsed with heptane. 12.45 Gm (yield: 83.6%) of a white crystal (1H,1H, 2H, 2H-perfluorodecyl triflate, $CF_3(CF_2)_nCH_2CH_2OSO_2CF_3$, n=7) was obtained.

5.96 Gm (10 mmol) of the thus obtained 1H, 1H, 2H, 2H-perfluorodecyl triflate was added into a solution containing 30 ml of methylene chloride and 1.37 gm of (10 mmol) of 4-pyridinepropanol (Aldrich). The reaction mixture was stirred for 6 hours to allow the reaction to complete. After settling, the lower layer was separated and dried. 5.59 Gm of a light yellow solid, 1-(3,3,4,4,5,5,6,6,7,7,8,8,9,9,10,10-heptadecafluoro-decyl)-4-(3-hydroxy-propyl)-pyridinium trifluoromethanesulfonate (hereinafter referred to as F8POH) was obtained.

Other fluorinated pyridinium salts with different alkyl chains, e.g., n=6, n=9, n=11 and a mixture of n=5, 6, 7, 8, etc. were also synthesized according to the same procedure.

Metathesis of Counterions of F8POH 0.22 Gm of sodium hydride (from Aldrich) was added in three portions into a solution containing 15 gm of Krytox FSL (perfluoropropylene ether carboxylic acid, from DuPont, MW=2500), 30 gm of HFE-7200 (from 3M) and 10 gm of anhydrous ether (from Aldrich) during a period of an hour. Hydrogen was generated immediately. The reaction mixture was then stirred for another eight hours before excess sodium hydride was filtered out with a 0.45 μm membrane filter. Solvent was evaporated to obtain 14 gm of sodium Krytox carboxylate. IR showed the carbonyl vibration of the product was at 1693 $cm^{-1}$ and 1658 $cm^{-1}$ while the carbonyl vibration for Krytox FSL was at 1770 $cm^{-1}$.

14 Gm of sodium salt of Krytox 157FSL was dissolved in 100 ml of methanol, to which 5.25 gm of F8POH (prepared as intermediate in Preparation 2) was added and dissolved. The appearance of two phases was observed. The methanol solution was extracted twice with 100 ml of PFS2 (a fluorinated solvent from Solvay Solexis). The combined PFS2 layer was extracted with 50 ml of methanol twice, dried over sodium sulfate, filtered and stripped of solvent to yield 13 gm of the product. The spectrum of $^{19}$FNMR showed all of the triflate counter-ion was replaced with Krytox carboxylate. The structure of the metathesis product (F8C1) derived from F8POH is shown below:

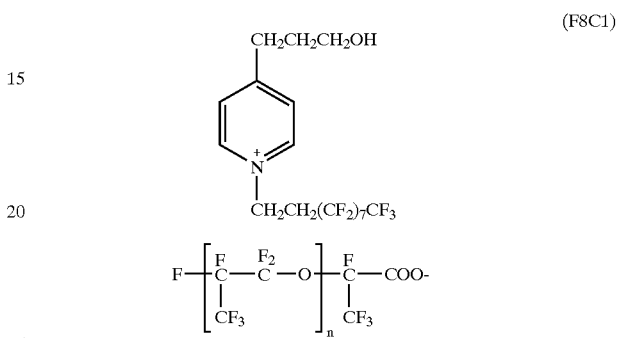

(F8C1)

$n \geq 1$

F8C1 is highly soluble in fluorinated solvents including perfluoropolyethers and hydrofluoropolyether, such as HT and ZT solvents from Solvay Solexis and E- or K-series of solvents from Du Pont.

Preparation 3

Preparation of $TiO_2$-Containing Microparticles 9.05 Gm of Desmodur® N3400 aliphatic polyisocyanate (from Bayer AG) and 0.49 g of triethanolamine (99%, Dow) were dissolved in 3.79 gm of MEK (methyl ethyl ketone). To the resultant solution, 13 gm of $TiO_2$ R706 (DuPont) was added and homogenized for 2 minutes with a rotor-stator homogenizer (IKA ULTRA-TURRAX T25, IKA WORKS) at ambient temperature. A solution containing 1.67 gm of 1,5-pentanediol (BASF), 1.35 gm of polypropylene oxide (mw=725 from Aldrich), 2.47 gm of MEK and 0.32 gm of a 2% dibutyltin dilaurate (Aldrich) solution in MEK was added and further homogenized for 2 minutes. In the final step, 0.9 gm of $R_f$-amine 4900 from Preparation 1 in 40.0 gm of HT-200 (Solvay Solexis) was added and homogenized for 2 minutes, followed by addition of additional 0.9 gm of $R_f$-amine 4900 in 33.0 g of HT-200 and homogenization for 2 minutes. A $TiO_2$-containing microparticle dispersion with low viscosity was obtained.

The microparticle dispersion obtained was heated at 80° C. overnight and stirred under low shear to post-cure the particles. The resultant microparticle dispersion was filtered through a 400-mesh (38 μm) screen and the solid content of the filtered dispersion was measured to be 29% by weight with an IR-200 Moisture Analyzer (Denver Instrument Company).

The mean particle size and standard deviation of the filtered dispersion measured with Beckman Coulter LS230 Particle Analyzer are 2.21 μm and 1.22 μm, respectively. The $TiO_2$-containing microparticle dispersion was used for the blend with the filler particles described below.

Preparation 4

Preparation of $TiO_2$-Containing Microparticles Containing a Reactive Pyridinium Salt 9.50 Gm of Desmodur® N3400 aliphatic polyisocyanate (from Bayer AG) and 0.49 gm of triethanolamine (99%, Dow) were dissolved in 3.79 gm of acetone (99.9% minimum by GC, Burdick & Jackson). To the resultant solution, 13 gm of TiO$_2$ R706 (DuPont) was added and homogenized for 2 minutes with a rotor-stator homogenizer (IKA ULTRA-TURRAX T25) at ambient temperature. A solution containing 0.45 gm of F8POH prepared from Preparation 2, 1.67 gm of 1,5-pentanediol (BASF), 1.35 gm of polypropylene oxide (mw=750, from Aldrich) and 2.47 gm acetone (99.9% minimum by GC, Burdick & Jackson) was added and homogenized for 1 minute; and finally 0.32 gm of a 2% solution of dibutyltin dilaurate (Aldrich) in acetone was added and homogenized for an additional minute. To the resultant slurry, 0.9 gm of R$_f$-amine4900 from Preparation 1 in 40.0 gm of HT-200 (Solvay Solexis) was added, homogenized for 2 minutes, followed by addition of additional 0.9 gm of the R$_f$-amine4900 in 33.0 gm of HT-200 and homogenization for 2 minutes. A TiO$_2$-containing microparticle dispersion of low viscosity was obtained.

The dispersion was heated at 80° C. overnight and stirred under low shear to post-cure the particles. The post-cured microparticle dispersion was filtered through a 400 mesh screen and the solid content of the filtered dispersion was measured to be 30% by weight with an IR-200 Moisture Analyzer (Denver Instrument Company).

The mean particle size and standard deviation of the filtered dispersion measured with Beckman Coulter LS230 Particle Analyzer are 1.02 µm and 0.34 µm, respectively. The TiO$_2$-containing microparticle dispersion was used for the blend with the filler particles described below.

Preparation 5

Preparation of TiO$_2$-Containing Microparticles

10 Gm of coated TiO2 particle TINT-AYD® PC9003 (Elementis, Specialties, Colorants and Additives, Jersey City, N.J.) was added to 8 gm of a THF solution containing 1 gm of N3300 aliphatic polyisocyanate (BayerAG). A stable, low viscosity dispersion was obtained. The slurry is added to a HT 200 (125 gm) solution containing 0.3 gm of tris(2-aminoethyl)amine and 2 gm of Krytox 157FSL under homogenization cooled by dry-ice acetone bath. After addition, dry-ice acetone bath is removed and temperature is slowly warmed up to room temperature. Resulting dispersion is homogenized at room temperature for 30 min, then at 70° C. for 2 hours. The particle size was measured by SEM to be about 1–2 µm.

The following examples (Example 1 to Example 5) show the synthesis of filler particles with the mean particle size in the range of 0.05–0.15 µm to improve the packing density of the TiO$_2$-containing particles prepared in Preparation 3–5.

Example 1

Preparation of Filler Particles by Dispersion Polymerization in Perfluorinated Solvent 10 Gm of methyl methacrylate (MMA, 99%, Aldrich), 0.15 gm of 2, 2'-azobisisobutyronitrile (AIBN, 98%, Aldrich), 8 gm of R$_f$-amine 4900 and 81.9 gm of HT 200 (Solvay Solexis) were fed into a 250 ml three-neck flask equipped with a Teflon stirrer blade powered by Stirpak ® Laboratory Mixer (Cole-Parmer Instrument Company). Reaction was carried out at 70° C. for 1.5 hours under argon with an agitation speed of 200 rpm. The reaction was terminated, the residual monomer was stripped off, and the particle dispersion was filtered through an 11-µm nylon net filter. The mean particle size and standard deviation were measured with Beckman Coulter LS230 Particle Analyzer to be 0.138 µm and 0.026 µm, respectively. The PMMA particle carries a positive charge and was used as the filler particles for the TiO$_2$-containing microparticles prepared in Preparation 3.

Example 2

Preparation of Silica-Containing Filler Particles

The same procedure of Example 1 was followed except that 7.0 gm of MMA, 1.0 gm of acrylic acid (99%, Aldrich), 5.0 gm of silica sol (MA-ST-M, 40% in methanol, Nissan Chemical), 0.14 gm of AIBN, 8.0 gm of R$_f$-amine 4900 and 81.9 gm of HT 200 (Solvay Solexis) were used for the dispersion polymerization. The mean particle size distribution and standard deviation were measured with Beckman Coulter LS230 Particle Analyzer to be 0.0683 µm and 0.014 µm, respectively. The silica-containing filler particle carries a negative charge and was used as the filler particles for the TiO$_2$-containing microparticles prepared in Preparation 3.

Example 3

Preparation of Silica-Containing Filler Particles

The same procedure of Example 1 was followed except that 7.0 gm of MMA, 1.0 gm of acrylic acid (99%, Aldrich), 0.2 gm of 1,6-hexanediol diacrylate (HDODA), 5.0 gm of silica sol (MA-ST-M, 40% in methanol, Nissan Chemical), 0.10 gm of AIBN, 4.0 gm of R$_f$-amine 4900 and 85.9 gm of HT 200 (Solvay Solexis) were used for the dispersion polymerization. The mean particle size and standard deviation were measured with Beckman Coulter LS230 Particle Analyzer to be 0.074 µm and 0.017 µm, respectively. The silica-containing filler particle carries a negative charge and was used as the filler particles for the TiO$_2$-containing microparticles prepared in Preparation 3.

Example 4

Preparation of Silica-Containing Filler Particles

The same procedure of Example 1 was followed except that 7.0 gm of MMA, 1.0 gm of acrylic acid (99%, Aldrich), 0.2 gm of 1,6-hexanediol diacrylate (HDODA), 5.0 gm of silica sol (MA-ST-M, 40% in methanol, Nissan Chemical), 0.10 gm of AIBN, 0.23 gm of eicosafluoroundecyl acrylate (Aldrich), 4.0 gm of R$_f$-amine 4900 and 85.9 gm of HT 200 (Solvay Solexis) were used for the dispersion polymerization. The mean particle size and standard deviation were measured with Beckman Coulter LS230 Particle Analyzer to be 0.085 µm and 0.020 µm, respectively. The silica-containing filler particle carries a negative charge and was used as the filler particles for the TiO$_2$-containing microparticles prepared in Preparation 3.

Example 5

Preparation of Silica-Containing Filler Particles

The same procedure of Example 1 was followed except that 5.0 gm of MMA, 2.0 gm of butyl methacrylate (BMA, 99%, Aldrich), 1.0 gm of acrylic acid (99%, Aldrich), 0.2 gm of 1,6-hexanediol diacrylate (HDODA), 5.0 gm of silica sol (MA-ST-M, 40% in methanol, Nissan Chemical), 0.10 gm of AIBN, 4.0 gm of R$_f$-amine 4900 and 85.9 gm of HT 200 (Solvay Solexis) were used for the dispersion polymerization. The particle size and standard deviation were measured with a Beckman Coulter LS230 Particle Analyzer to be 0.0813 μm and 0.021 μm, respectively. The silica-containing filler particle carries a negative charge and was used as the filler particles for the $TiO_2$-containing microparticles prepared in Preparation 3.

While particular forms of the invention have been illustrated and described, it will be apparent that various modifications can be made without departing from the spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A bi-modal electrophoretic composition comprising a dispersion of two types of particles of substantially the same polarity and substantially the same electrophoretic mobility or switching rate in a dielectric solvent or solvent mixture wherein one type of said particles is primary pigment particles and the other type is filler particles of a smaller size.

2. The composition of claim 1 wherein said primary pigment particles are formed of an organic or inorganic pigment.

3. The composition of claim 1 wherein said primary pigment particles are white.

4. The composition of claim 1 wherein said primary pigment particles are colored.

5. The composition of claim 3 wherein said primary pigment particles are $TiO_2$, $BaSO_4$, ZnO or hollow particles.

6. The composition of claim 5 wherein said primary pigment particles are $TiO_2$ particles.

7. The composition of claim 1 wherein the particle size or diameter of the primary pigment particles is in the range of about 0.1 to about 10 microns.

8. The composition of claim 7 wherein the particle size or diameter of the primary pigment particles is in the range of about 0.2 to about 2 microns.

9. The composition of claim 1 wherein said primary pigment particles are coated or microencapsulated.

10. The composition of claim 9 wherein the densities of the primary pigment particles and the filler particles are matched to that of the dielectric solvent or solvent mixture in which the two types of the particles are dispersed.

11. The composition of claim 1 wherein said filler particles are small enough to be filled in the interstices of the primary particles.

12. The composition of claim 11 wherein the ratio of the average particle size or diameter of the filler-particles to that of the primary pigment particles is in the range of about 1/30 to about 1/5.

13. The composition of claim 12 wherein the ratio of the average particle size or diameter of the filler particles to that of the primary pigment particles is in the range of about 1/15 to about 1/8.

14. The composition of claim 1 wherein the primary pigment particles have an average diameter of about 0.2 to about 5 microns and the filled particles have an average diameter in the range of about 0.007 to about 1 microns.

15. The composition of claim 14 wherein the filler particles have an average diameter in the range of about 0.013 to about 0.63 microns.

16. The composition of claim 1 wherein the difference in the electrophoretic velocity of the two types of particles is less than about 30% of the average velocity of the primary pigment particles.

17. The composition of claim 16 wherein the difference in the electrophoretic velocity of the two types of particles is less than about 20% of the average velocity of the primary pigment particles.

18. The composition of claim 1 wherein said filler particles have a refractive index significantly different from that of the primary particles.

19. The composition of claim 18 wherein the refractive index difference between the two types of particles is greater than 0.2.

20. The composition of claim 18 wherein the refractive index difference between the two types of particles is greater than 1.

21. The composition of claim 6 wherein the filler particles are colorless or white.

22. The composition of claim 1 wherein said filler particles are formed from a material selected from a group consisting of PMMA latex or dispersion, glass beads, ZnO, $BaSO_4$ and silica.

23. The composition of claim 1 wherein said filler particles are crosslinked polymer particles or polymer-coated silica particles.

24. The composition of claim 1 wherein the volume ratio of the filler particles to the primary particles is in the range of about 5/95 to about 40/60.

25. The composition of claim 24 wherein the volume ratio of the filler particles to the primary particles is in the range of about 15/85 to about 30/70.

26. The composition of claim 1 wherein said dielectric solvent is a halogenated solvent.

27. The composition of claim 26 wherein said halogenated solvent is a perfluorinated solvent.

28. The composition of claim 1 wherein said filler particles comprise a perfluorinated polymeric dispersant or charge controlling agent.

29. The composition of claim 28 wherein said perfluorinated polymeric dispersant or charge controlling agent is chemically bonded onto the filler particles.

30. An electrophoretic display comprising display cells filled with a bi-modal electrophoretic composition which comprises a dispersion of two types of particles of substantially the same polarity and substantially the same electrophoretic mobility or switching rate in a dielectric solvent or solvent mixture wherein one type of said particles is primary pigment particles and the other type is filler particles of a smaller size.

31. The electrophoretic display of claim 30 which is driven by an up/down switching mode.

32. The electrophoretic display of claim 30 which is driven by an in-plane switching mode.

33. The electrophoretic display of claim 30 which is driven by a dual switching mode which includes both the in-plane and up/down switching modes.

* * * * *